US008554781B2

(12) United States Patent
Teicher

(10) Patent No.: US 8,554,781 B2
(45) Date of Patent: Oct. 8, 2013

(54) SHORTHAND FOR DATA RETRIEVAL FROM A DATABASE

(71) Applicant: Mordechai Teicher, Hod-Hasharon (IL)

(72) Inventor: Mordechai Teicher, Hod-Hasharon (IL)

(*) Notice: Subject to any disclaimer, the term of this patent is extended or adjusted under 35 U.S.C. 154(b) by 0 days.

(21) Appl. No.: 13/723,200

(22) Filed: Dec. 21, 2012

(65) Prior Publication Data
US 2013/0166581 A1 Jun. 27, 2013

Related U.S. Application Data

(60) Provisional application No. 61/580,362, filed on Dec. 27, 2011.

(51) Int. Cl.
*G06F 17/30* (2006.01)
*G06F 7/00* (2006.01)
*G06F 3/01* (2006.01)
*G06F 3/023* (2006.01)

(52) U.S. Cl.
CPC ...... *G06F 17/30* (2013.01); *G06F 7/00* (2013.01); *G06F 3/01* (2013.01); *G06F 3/0233* (2013.01)
USPC .......................................................... 707/758

(58) Field of Classification Search
None
See application file for complete search history.

(56) References Cited

U.S. PATENT DOCUMENTS

| 4,737,040 | A | * | 4/1988 | Moon ............................ 400/110 |
|---|---|---|---|---|
| 5,619,563 | A | | 4/1997 | Hsiao |
| 6,009,444 | A | | 12/1999 | Chen |
| 6,459,390 | B1 | * | 10/2002 | Kim ................................ 341/20 |
| 6,809,725 | B1 | * | 10/2004 | Zhang ........................... 345/171 |
| 7,658,561 | B2 | | 2/2010 | Vuong |
| 2003/0088398 | A1 | * | 5/2003 | Guo et al. ........................ 704/8 |
| 2003/0189553 | A1 | * | 10/2003 | Goren ........................... 345/173 |
| 2004/0204011 | A1 | * | 10/2004 | Lyustin et al. ............. 455/550.1 |
| 2006/0279433 | A1 | * | 12/2006 | Cui et al. ......................... 341/22 |
| 2008/0075517 | A1 | * | 3/2008 | Vuong .......................... 400/486 |
| 2009/0144260 | A1 | * | 6/2009 | Bennett et al. .................... 707/5 |
| 2011/0310042 | A1 | | 12/2011 | Breuer |
| 2011/0320975 | A1 | * | 12/2011 | Breuer .......................... 715/773 |

OTHER PUBLICATIONS

Magerkurth, Carsten, and Richard Stenzel. "A pervasive keyboard-separating input from display." Pervasive Computing and Communications, 2003.(PerCom 2003). Proceedings of the First IEEE International Conference on. IEEE, 2003.*
Sukswai, Silpol, and K. Piromsopa. "Conslide: A Thai soft keyboard for mobile text input." Computer Science and Software Engineering (JCSSE), 2011 Eighth International Joint Conference on. IEEE, 2011.*
Janpinijrut, Siwacha, et al., Vowel-separated layout: a Thai touchscreen keyboard for people with hand movement disability, Proceedings of the 5th International Conference on Rehabilitation Engineering & Assistive Technology. Singapore Therapeutic, Assistive & Rehabilitative Technologies (START) Centre, 2011.*

* cited by examiner

*Primary Examiner* — Neveen Abel Jalil
*Assistant Examiner* — Kristofer Biskeborn

(57) ABSTRACT

A method and apparatus for convenient and fast entry of a search string for searching a database. A subset of the alphabet (such as the vowels) is used for entry of a search string, and database matches are determined according to the appearance of the subset characters in the search fields of the database records. The use of the alphabet subset reduces the size of the entry keypad and simplifies user entry of the search string.

20 Claims, 9 Drawing Sheets

| ID | first_name | last_name | phone |
|---|---|---|---|
| AE | Brad | Hess | (674) 555-7526 |
| AE | Kay | Hess | (697) 555-3316 |
| AE | Marc | Perry | (317) 555-8364 |
| AEA | Alex | Yang | (934) 555-8990 |
| AEAA | Alfred | Randall | (306) 555-7934 |
| AEAAE | Andrea | Warren | (561) 555-7309 |
| AEAE | Jane | Case | (192) 555-1066 |
| AEAE | Tracey | Dale | (400) 555-7929 |
| AEAEA | Alexander | Gray | (865) 555-4478 |
| AEAI | Grace | Harding | (947) 555-5133 |
| AEAI | Warren | Jain | (628) 555-7510 |
| AEAIO | Gayle | Faircloth | (903) 555-7360 |
| AEAO | Angela | Short | (885) 555-4351 |
| AEAO | Rachel | Jackson | (805) 555-6590 |
| AEAO | Stacey | Carson | (770) 555-8298 |
| AEAO | Wade | Hampton | (770) 555-5580 |
| AEAOE | Andrea | Powell | (893) 555-6328 |
| AEAOO | Angela | Thornton | (398) 555-2088 |
| AEAUE | Janet | Faulkner | (373) 555-5979 |

| | | |
|---|---|---|
| AAA | Anna | Chan |
| AAA | Brad | Ballard |
| AAA | Carla | Zhang |
| AAA | Cathy | Haas |
| AAA | Clara | Day |
| AAA | Harry | Abrams |
| AAA | Karl | Adams |
| AAA | Zachary | Barr |
| AAE | Harry | Archer |
| AAE | Max | Craven |
| AAE | Sally | Baxter |

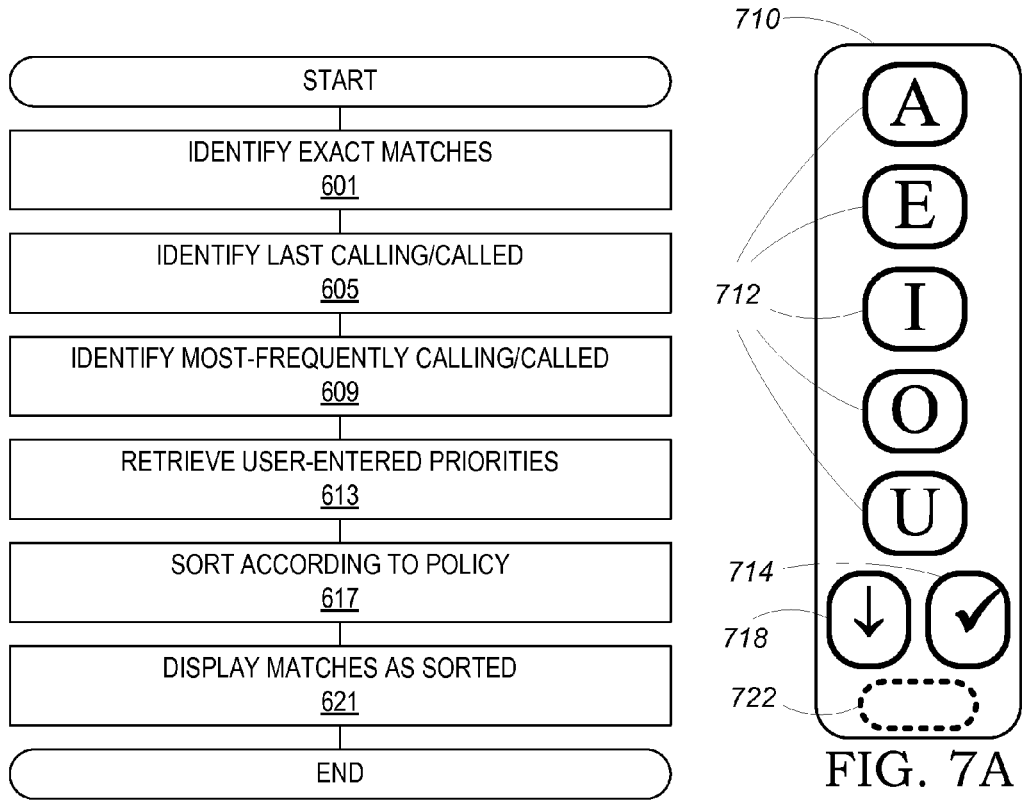
FIG. 6
FIG. 7A
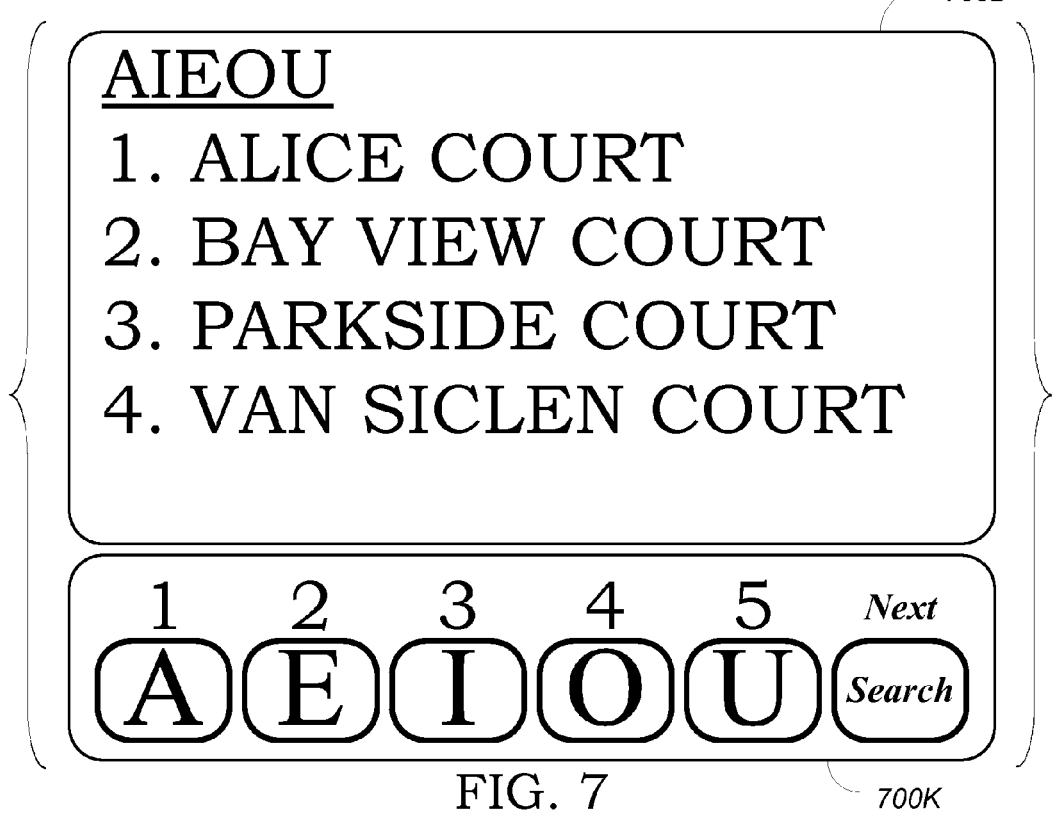
FIG. 7

SHORTHAND FOR DATA RETRIEVAL FROM A DATABASE

CROSS REFERENCE TO RELATED APPLICATIONS

This application claims the benefit of U.S. provisional patent application No. 61/580,362 filed on Dec. 27, 2011, the contents of which are incorporated by reference in their entirety as if set forth herein.

FIELD

The present invention relates to data retrieval from a database by text query, and in particular to such data retrieval under circumstance that make conventional text query entries inconvenient or unsafe.

BACKGROUND

Users of mobile communication devices often need to retrieve data from a database. For example, a user may want to place a phone call and needs to retrieve the phone number from a contact database stored in his mobile phone; or he may want to navigate by car to a restaurant and needs to retrieve data from a database of a navigation service that is accessible via the mobile network.

Retrieval of data from a database often requires entering a text string to be interpreted by an application program, such as a phone dialer or a navigation program. In response, the application program identifies records from the database that match the entered string, and presents the identified records to the user for selection or approval. Upon receiving the user selection or approval, the application program performs an action, such as dialing a phone number or navigating to a desired destination.

The small size of many mobile devices affords only small-sized keypad and screen. Many mobile devices feature a touchscreen whose small area is shared between keypad and display functionalities. Many users of mobile devices find it difficult to read the tiny soft keys displayed on the screen and to accurately tap the desired keys. Such difficulties are further increased when the mobile device is used when driving a car, for example for placing a phone call or navigating to a desired destination, in which case text data entry becomes not only inconvenient but also unsafe.

Voice commands offer a relatively convenient and safe alternative to key stroke entry for some users, while other users find voice commands inaccurate and frustrating to use. Therefore, it would be advantageous to have a more convenient and safer way to enter text into a mobile device for retrieving data from a database.

SUMMARY

The present invention provides an easy and safe way for entering text into a mobile device for retrieving data from a database. In embodiments of the invention, a keypad having a proper subset of the alphabet is presented to the user for entering characters of a search query.

The present disclosure describes how embodiments of the present invention use a relatively-small subset of an alphabet (not more than 50% of the characters of the alphabet) in a text query for data retrieval from a database. In certain non-limiting embodiments of the invention, the subset includes only vowels. Users familiar with a language readily distinguish its vowels from its consonants and find it easy to pick out and enter the vowels of a name or other item as a query search string. The term "search string" herein denotes a string of text characters entered by a user, which is then used by a database search engine to locate one or more desired records in the database. Examples discussed below show how a user can quickly become proficient in rapidly and accurately entering compact search strings based on such alphabetic subsets. The reduced size and complexity of the keypads needed for entering alphabetic subsets further improves the convenience, speed, and accuracy of shorthand searches according to embodiments of the present invention.

After the user enters a search string containing a sequence of characters of the subset, a search program employing a processor searches the database to find records having the same sequence within a predefined function of the contents of text fields in the records. A match occurs when the characters of the search string appear interspersed in the predefined function in the same order as the characters appear in the search string. Because the predefined function of the contents of the text fields in general contain characters from the full alphabet, the characters of the subset do not in general appear contiguously in the predefined function. Below are examples illustrating records, text fields, predefined functions, search strings, and matching operations according to various embodiments of the present invention.

DEFINITIONS

The term "alphabet" herein denotes a set of non-numeric text characters used in a written natural language to express spoken sounds including words and names in that language. The term "text" herein denotes an ordered character string containing at least one character selected from a predefined alphabet.

"Small mobile device", also abbreviated "mobile device", relates herein to a device that can be conveniently carried by a person or integrated within a vehicle. Examples of a mobile device are a portable cellular telephone, a portable navigation device, or a navigation device that is fixed within a dashboard of a vehicle.

"Touchscreen" denotes herein a screen that is sensitive to touch by a finger and/or stylus. Touchscreens are used by users as an input/output (I/O) interface, and have the advantage of dynamically modifying the appearance and functionality of the screen's input operation according to the context. The terms "screen" and "display" are herein used interchangeably to denote a graphical output device. A screen may be a touchscreen or be insensitive to touch.

The terms "soft key" and "button", herein denote a key temporarily drawn on a touchscreen as a character, character string, icon or picture. A user presses a soft key to enter data or to execute a command. A "soft keypad" is includes multiple soft keys on a touchscreen. The term "hard key" herein denotes a hardware key or button, such as a key of a conventional keyboard. The term "key" without any modifiers herein denotes either a soft key or a hard key. A "hard keypad" is a set of hard keys. The term "keypad" without any modifiers herein denotes any of: a soft keypad; a hard keypad; or a combination of soft keys and hard keys.

The terms "touch", "press", "tap", and "stroke" herein interchangeably denote an action by a user for activating a key, by finger, stylus, voice command, or other means.

An embodiment of the present invention provides a phone dialer for a mobile phone. A subset of the alphabet is selected to be small enough to provide keys of sufficiently-large size, with the alphabet subset's characters chosen to be easy for users to identify within conventional text strings, even when not viewing the text strings on a display. Such requirements are satisfied, for example for users of the English language, by a soft keypad that displays the vowels "A", "E", "I", "O", "U", as well as a few control keys such as "Search" or "Contacts". An alphabet subset of five to twelve characters, for example, can be displayed, on most small screens of mobile phones, as large soft keys that can be easily and accurately recognized and pressed. On the other hand, many users will find it intuitive and easy, even without training, to start with the string "William Smith" and get from it a search string of vowels "IIAI"; and to start with the string "John Doe" and get from it a search string "OOE"; and then proceed by pressing the appropriate keys for a dial-by-vowel process according to embodiments of the present invention.

In practice, using vowels to represent names will often yield more than one match. For example, both "Billy Wang" and "Tim Starr" match the vowel string "IA". Therefore, when entering a string of vowels, the user will often be prompted, according to certain embodiments of the invention, with several names for further selection, such as by being prompted to press one of several soft buttons bearing contacts' names. When the number of results is small, for example up to five, such results can be displayed on a single small touchscreen as large buttons for further selection. A larger number of results may occupy a few screens, requiring paging or scrolling, which is less convenient. However, since, for a given contact database of a user, all name entries can be analyzed in advance, measures can be taken to reduce such inconvenience, including, but not limited to:

(1) the user may be presented with the instances of excessive multiple name matches for certain strings of vowels, and delete some obsolete entries from the database, or hide them from the present dial-by-vowel option, or prioritize their order of appearance on multiple screens;

(2) the alphabet subset may be extended, as the non-limiting example of also including one or more of "H", "W", "Y";

(3) the user may be encouraged to consistently use full names in his contact list, for example replace "Bill" with "William". The need for such measures may depend on the size of the screen, the size of the contact list, the specific contents in the contact list, and the database language.

The alphabet subset used for data entry must allow for effective data retrieval, must be easy to intuitively recognize by users within common vocabulary even without viewing a written or displayed version of the target term, and must be sufficiently compact to justify a shorthand entry, instead of conventional text data entry. Regarding compactness, it will be assumed that an alphabet subset than includes not more than half of the full alphabet characters will be considered compact.

Embodiments of the present invention thus provide a method for retrieving data from a database, the database including a plurality of database records, each database record having one or more text fields containing ordered characters from an alphabet, the method including: (a) identifying to a user a predefined subset of the alphabet, the subset including no more than the smaller of: half of the alphabet or sixteen characters of the alphabet; (b) receiving from the user a sequence of one or more characters of the subset; (c) retrieving, by a processor, a non-negative integer number of database records, wherein each retrieved database record includes the characters of the sequence interspersed within a predefined function of at least one text field of the database record, such that the interspersed characters appear in the same order as the characters of the sequence; and (d) if the non-negative integer number is at least one, presenting the retrieved database records to the user. In a specific embodiment the database is a contact database and the predefined function concatenates name fields of the database record; in such a case, the method may continue with receiving a user input that selects a selected database record from the retrieved database records, extracting an address from the selected database record, and initiating a communication session according to the address, the communication session may include one of: a telephone call, a short text message, an email, an instant messaging session, a social network message, or a multimedia message.

The character subset may be identified to the user by displaying the subset as a keypad on a touch screen, or by displaying the subset on a set of physical keys of a hard keypad. Examples of the character subset include the vowels a,e,i,o, and u, and optionally also one or more of the characters h, y, or w. In addition to the characters of the subset, a respective input device may also include control characters.

A specific case of interest thus relates to a method for initiating a communication session from a mobile device. The mobile device includes a storage device that stores a contact database, the database including a plurality of database records, each database record including a contact identifier in the form of an ordered set of characters from an alphabet, and address data effective for initiating a communication session. The method includes: (a) identifying to a user a predefined subset of the alphabet, the subset including no more than the smaller of: half of the alphabet or sixteen characters of the alphabet; (b) receiving from the user a sequence of one or more characters of the subset; (c) retrieving a non-negative integer number of database records, wherein each retrieved database record includes the characters of the sequence interspersed within the contact identifier of the retrieved database record, such that the interspersed characters appear in the same order as the characters of the sequence; and (d) if the non-negative integer number is at least one, then: (i) identifying to the user the retrieved database records, (ii) receiving from the user a command related to a selected record of the retrieved database records, and (iii) initiating a communication session according to address data included in the selected record. The communication session may include one of: a telephone call, a short text message, an email, an instant messaging session, a social network message, or a multimedia message.

A preferred embodiment of the present invention is in the form of a mobile communication device that includes: (a) a communication module; (b) a storage device storing a contact database, the database including a plurality of database records, each database record including a contact identifier in the form of an ordered set of characters from an alphabet, and address data; (c) an input device identifying to a user a predefined subset of the alphabet, the subset including no more than the smaller of: half of the alphabet or sixteen characters of the alphabet; and (d) a processor programmed to initiate a communication session by: (i) receiving from the input device a sequence of one or more characters of the subset, (ii) retrieving a non-negative integer number of database records, wherein each retrieved database record includes the characters of the sequence interspersed within the contact identifier of the retrieved database record, such that the interspersed characters appear in the same order as the characters of the sequence, and, (iii) if the non-negative integer number is at least one, then: (A) identifying to the user the retrieved database records, (B) receiving from the input device a command related to a selected record of the retrieved database records, and (C) activating the communication module for initiating a communication session according to address data included in the selected record. The communication session may include one of: a telephone call, a short text message, an email, an instant messaging session, a social network message, or a multimedia message.

The input device may be, for example, a soft keypad that includes the subset characters displayed on a touch screen, or a hard keypad including physical keys displaying the subset characters.

BRIEF DESCRIPTION OF THE DRAWINGS

The present invention will be understood and appreciated more fully from the following detailed description, taken in conjunction with the drawings in which:

FIG. 5A and FIG. 5B illustrate data tables according to an embodiment of the present invention.

FIG. 6 illustrates a method according to an embodiment of the present invention.

FIG. 7 illustrates a keypad and display unit according to an embodiment of the present invention.

FIG. 7A illustrates a compact keypad according to an embodiment of the present invention.

DETAILED DESCRIPTION

Figure 1A:
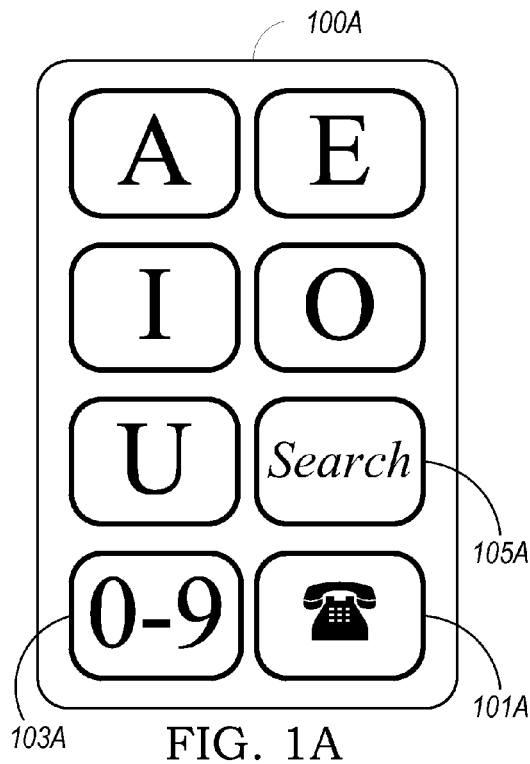
FIG. 1A illustrates an English-language keypad according to an embodiment of the present invention.
Figure 1B:
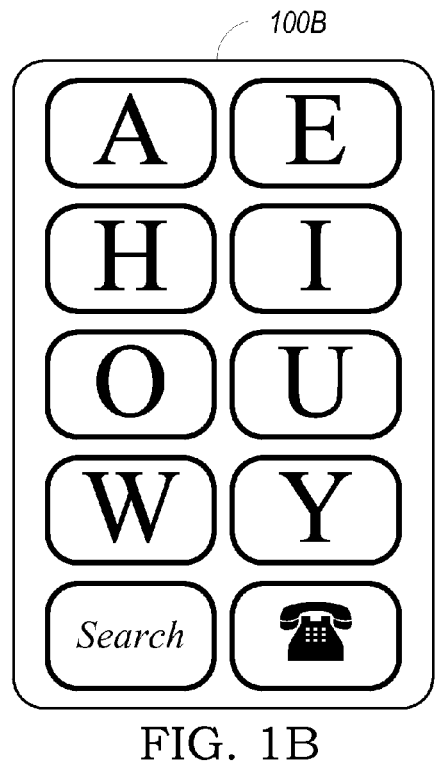
FIG. 1B illustrates an English-language keypad according to another embodiment of the present invention.
Figure 1C:
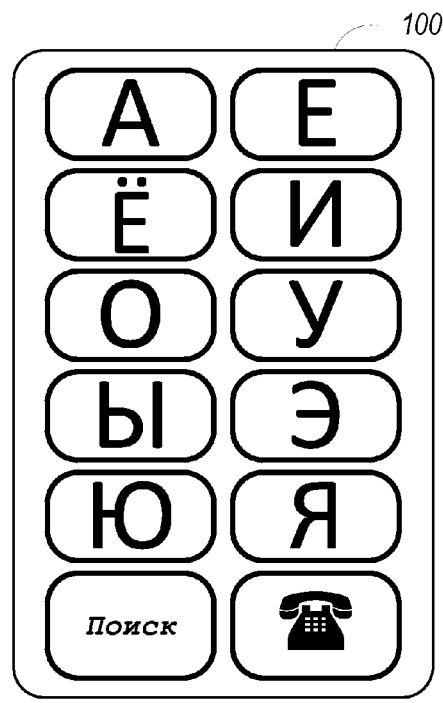
FIG. 1C illustrates a Russian-language keypad according to yet another embodiment of the present invention.
Figure 1D:
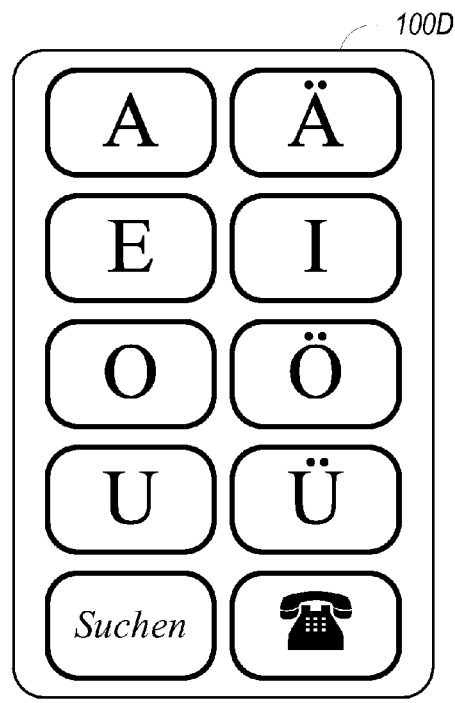
FIG. 1D illustrates a German-language keypad according to still another embodiment of the present invention.

Various embodiments described below with reference to the drawings focus on the non-limiting exemplary application of a phone dialer. Similar embodiments are intended to serve in other applications requiring data retrieval via queries using only a compact subset of the alphabet.

Search Conventions

In the known art, a database search identifies and optionally retrieves records matching criteria entered by a user via a query. Queries often include text entered by the user. Sometimes, all the text in a record is searched, while in other cases only a certain field or fields containing text are searched, for narrowing the search to only pertinent data. For example, a contact database may include text fields, such as <first_name>, <last_name>, <job_title>, <home_address>, <work_address>, <email>, <phone>, etc. In the example of a phone dialer, searching though all fields of such a contact database may yield many irrelevant results by finding matches in street names when looking for matches within person names. Accordingly, in the non-limiting embodiment of a phone dialer described below, matches are sought only within the concatenation of the predefined fields <first_ name>+<last_ name>. The user-entered text to be matched is typically referred to as the search string, and corresponds to the fields being searched. In a typical current search on these predefined fields, a user who wants to find a record with "William" as <first_name> and "Smith" as <last_name> enters the search string "William Smith". Other conventions are also used, for example including a middle name, or starting with the last name, or selecting a company name when the personal name fields are empty, etc. Such conventions are typically configured by application programmers or by the user, according to application specifics or personal preferences, respectively.

Exemplary Soft Keypads

Reference is made to FIGS. 1A-1D which conceptually illustrate exemplary soft keypads according to certain embodiments of the present invention. In related embodiments, keypads occupy all or part of a touchscreen, where another part of the screen (not shown in the drawings) may be used for displaying the string of characters that have been already entered by the user by pressing the soft keys, as well as prompts, hints or instructions. A keypad 100A utilizes the Roman (Latin) alphabet and includes the vowels "A", "E", "I", "O", and "U". The "Search" button 105A is used to explicitly initiate a search for matches according to the search string entered so far, while a button 101A with the telephone icon (a "Contacts" button) allows the user to switch to a full keyboard or standard contact application that does not implement the teachings of the present disclosure (see FIGS. 2A-2B below). A "0-9" button 103A allows the user to switch to a numeric dialing keypad. In a related embodiment, a keypad 100B includes additional characters "H", "Y", "W" to the usable alphabet subset, in comparison with the alphabet subset of keypad 100A. Such an addition may be helpful where the contact database is very large, as well as for users that find it easy to intuitively identify such extra letters within names. A keypad 100C and a keypad 100D illustrate exemplary keypads devised for users of the Russian (Cyrillic) and German alphabets, respectively.

Dialing Process

Figure 2A:
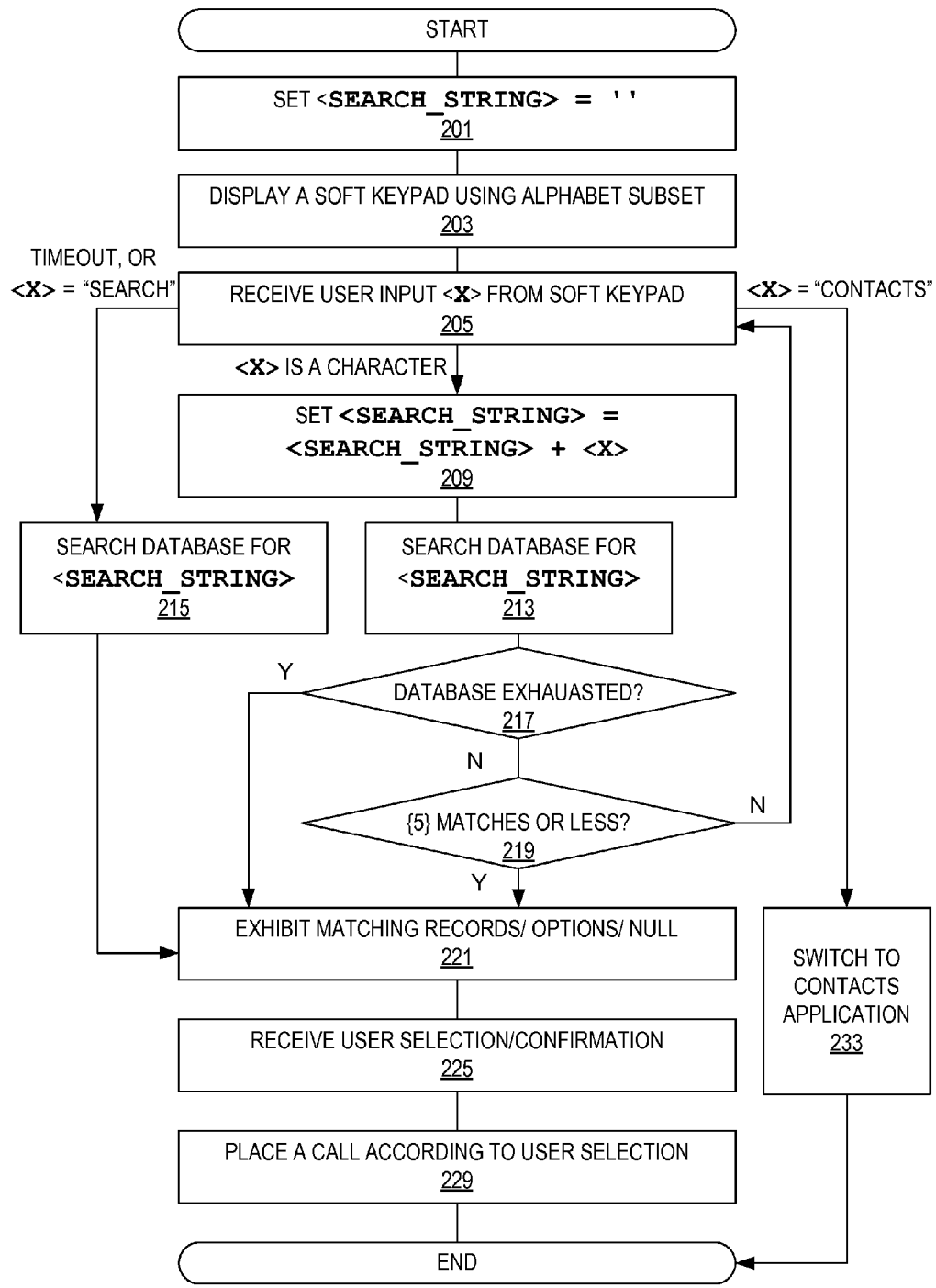
FIG. 2A illustrates a method according to an embodiment of the present invention.

Reference is now made to FIG. 2A, which illustrates a method according to an embodiment of the invention, for using a keypad such as keypads 100A-100D (FIGS. 1A-1D), for placing a phone call to a desired contact. The following description relates specifically to keypad 100A (FIG. 1A). The procedure is initiated when a dialer according to an embodiment of the invention is activated by the phone's operating system (not shown in FIG. 2A). In a step 201 an input search string (<SEARCH_STRING>) is initialized to an empty string. In a step 203, a soft screen, such as screen 100A (FIG. 1A), is displayed to the user for entering a character from the subset (a vowel in the present example) or a control entry such as a "Search" button 105A or "Contacts" button 101A. The display in step 203 also serves to identify the characters of the alphabetic subset to the user, such as by including the characters of the subset on soft keys. In other embodiments of the invention, the characters of the alphabetic subset may be identified to the user in different ways, such as via hard keys or synthesized speech. In a step 205, a user entry <X> from a single key stroke is expected to be received. If no input is received within a predetermined time, such as ten seconds in a non-limiting example (i.e. a timeout situation), or <X> represents "Search" button 105A (a control key—see keypad 100A), then in a step 215 a search is initiated according to the current content of the input search string (herein denoted as <SEARCH_STRING>). If <X> represents "Contacts" button 101A, then the current input screen is replaced with a conventional keypad that includes the entire alphabet for data entry. In a related embodiment, the current process is terminated or suspended, and the operating system is called to switch to a default contact application that allows conventional data entry using the entire alphabet. If <X> is a keypad character (a vowel in this embodiment), then in a step 209 <X> is appended to the end of the previous input search string; for example, if the previous input search string was "IIA" and the current entry <X> is the subset character "I", then the input search string becomes "IIAI".

In a step 213 the contact database is searched for names (represented by the concatenated string <first_name>+<last_name>) matching the current input search string. According to various embodiments of the present invention, the following criteria are applied to determine a match: a match occurs either when the current input search string equals the entire string of alphabetic subset characters (in this example, the vowels) extracted in order from the name (exact match), or when the current input search string equals only the beginning of the string of alphabetic subset characters (in this example, the vowels) extracted in order from the name (partial match). In the present non-limiting example, for the name "William Smith", the input search string "IIAI" is an exact match for the vowels extracted in order from the name, while "I", "II" and "IIA" are partial matches. It will be appreciated that in the present exemplary embodiment, both an exact match and a partial match are considered a match, while is some other examples or embodiments, only an exact match may be considered a match, which may be determined by the application programmer or be set by the user according to personal preferences. Other embodiments of the present invention effect the same matching without directly extracting the alphabetic subset characters from the names. Matching methods according to embodiments of the invention are further elaborated below with reference to FIG. 2C in the discussion below on "Exact and Partial Matching".

In a step 217, the current input search string is checked against the database to find out whether the database has been exhausted so that no additional input has the potential to further narrow the search results. For example, if the current search string is "IIAI" and there are no matches in the database for any of "IIAI[AEIOU]" (i.e. "IIAIA", "IIAIE", "IIAII", "IIAIO" or "IIAIU"), then the database is considered to be exhausted. If the database is found to be exhausted, then the process branches to a step 221, otherwise it continues to a step 219.

In step 219 the number of matches is counted and compared against a predefined parameter, 5 in the present example, to determine whether the display of the names of the current matches may fit within a single screen in the form of sufficiently-large buttons. Thus {5} represents a parameter that depends on the screen size versus the minimum button size that is still convenient to view and press, and may be set by the application programmer and/or by the user according to personal preferences. If, in step 219, the number of matches is found too large for occupying the screen, the method branches back to step 205, waiting for the user's entering the next vowel into the soft keypad.

The search in step 215 is similar to that of step 213, except that it is followed directly by step 221 instead of going through step 217.

In step 221, the matches found in step 213 or step 215 are exhibited on the mobile device's screen as buttons that can be pressed for further selection and approval, as will be discussed below with reference to FIGS. 3A-3D. In a related embodiment, the matched names are presented to the user aurally, via text-to-speech technology, to which the user responds with a voice selection. Instead of exhibiting a name list, step 221 may exhibit a null list if no match has been found, and may also provide the user with additional options, such as pressing a "Restart" button (not shown) for restarting the search in case of a user mistake in the character entry.

Matches that have successfully passed step 219 will occupy a single screen, in step 221, while those that stem from step 215 may occupy one screen or several screens, the latter possibly requiring paging or scrolling in order to reach and press the desired contact. In a step 225, a key pressed by the user (or a voice command) identifies the selected name or confirms placing a call in case that only a single match has been found. In a step 229 a call is placed according to the user selection or confirmation in step 225.

General Data Retrieval from a Database

Additional embodiments of the present invention are useful in other applications of data retrieval from a database while using small screens. Representative non-limiting examples include extracting an address from a retrieved record of a contact database, or entering an address into a navigation device that employs a built-in or server-based address database. In another embodiment of the invention, the extracted address is used to initiate a communication session, such as: a telephone call; a short text message, such as via the Short Message Service (SMS); an email or instant messaging session; a social network message; or a multimedia message.

Figure 2B:
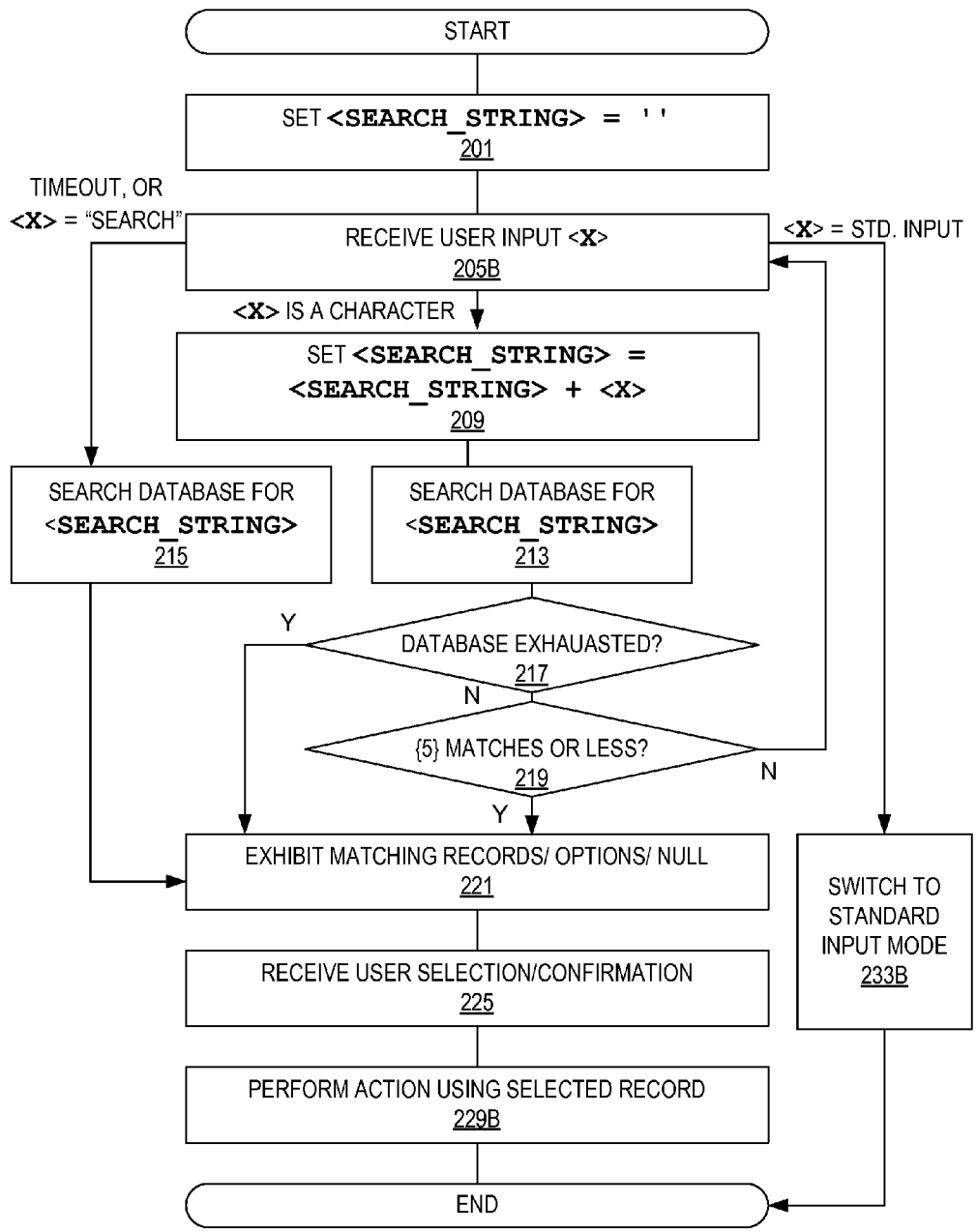
FIG. 2B illustrates a method according to another embodiment of the present invention.

FIG. 2B illustrates a more general case of data retrieval from a database using a small screen, according to further embodiments of the present invention. Steps of FIG. 2B are similar to those of FIG. 2A, except as noted in the following:

Step 203 of FIG. 2A is not explicitly included, since the keypad used may be based on hard keys (see FIG. 8), or voice commands may be used. Data entry in a step 205B can be made by a soft key, a hard key, or by a voice command. The branch from step 205B to a step 233B relates to switching to any keyboard or respective application that allows entries that use the full alphabet, and is not restricted to the Contacts application illustrated in FIG. 2A. The database searched in step 213B may reside either in the mobile device, such as in an address book, or in a remote database hosted on a server, such as in an online navigation service. And a step 229B is not limited to placing a call, but can be any operation that uses a search result as in input. Non-limiting examples include displaying an address from an address book and navigating to an address retrieved from a navigation server.

Exact and Partial Matching

Figure 2C:
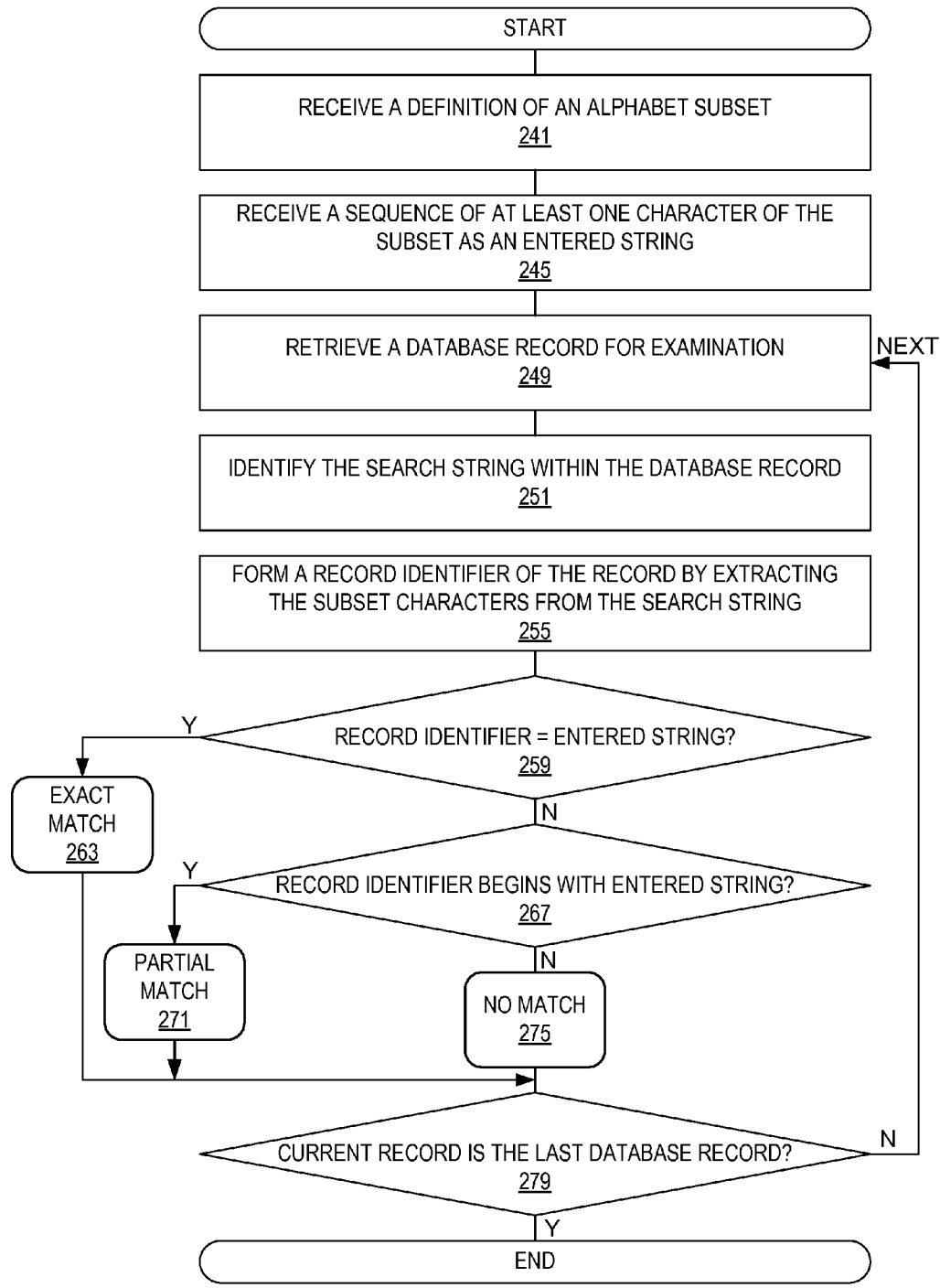
FIG. 2C illustrates a method according to yet another embodiment of the present invention.
Figure 8:
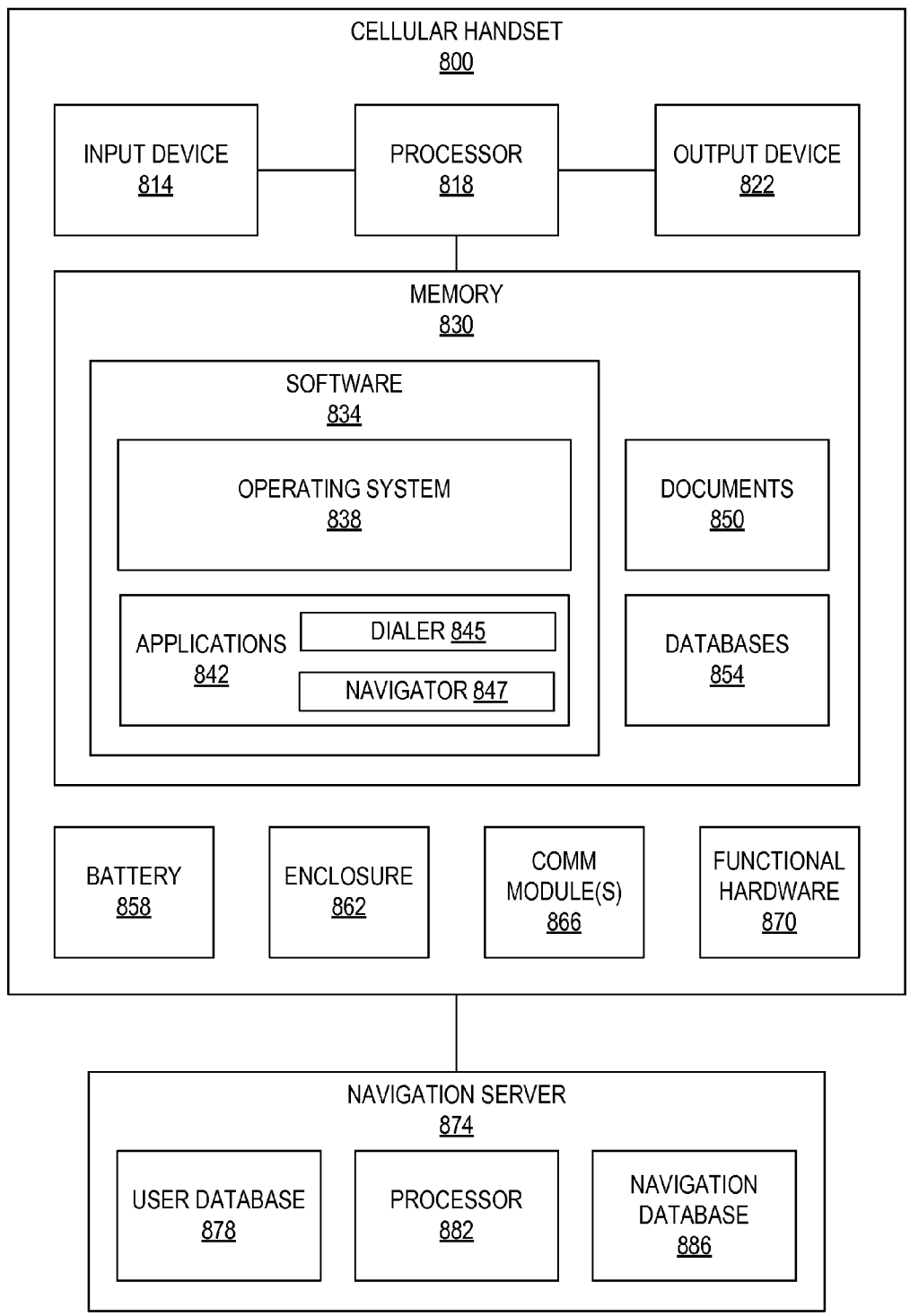
FIG. 8 illustrates a hardware block diagram according to embodiments of the resent invention.

FIG. 2C illustrates a method for matching according to an embodiment of the invention. In a step 241, the definition of the selected alphabet subset is received by a processor, such as processor 818 of cellular handset 800 (FIG. 8). In a non-limiting example, the subset is the set of vowels {"A", "E", "I", "O", "U"}.

In a step 245, an input search string is received from a user, and includes a sequence of characters entered so far by the user. In a step 249, a database record is retrieved for examination, to determine whether there is an exact of partial match with the input search string of step 245. In a step 251, a predetermined function of search fields (for example, the concatenation <first_name>+<last_name>) is associated with the database record schema, which may include other fields of data that are not presently searched, such as <address>, <company>, etc. The term "search field" herein denotes any field of a database record which is used to determine whether the record should be retrieved in a search according to a search string. Preferably, a predetermined function of search fields is used to determine a match with a user-input search string. As an example, the fields <first_name> and <last name> are considered search fields, while <first_name>+<last_name> concatenated (i.e. the full name) are the predefined function serving for identifying matches with search strings entered by the user. It will noted, that some programmers or some users may prefer <last_name>+<first_name> as the predefined function, which may be fine, as long as the user is aware of the search strings that he is supposed to enter for seeking matches. In a step 255 a record identifier representing the present record is formed by extracting the alphabet's subset characters (in certain embodiments, the vowels) from the fields of the record according to the predetermined function of search fields, while retaining their order. In the present example, the record identifier of the record having <first_name>="William" and <last name>="Smith" is the extracted vowels of "WilliamSmith", i.e., the record identifier is "IIAI" (converted to uppercase for case-insensitivity). In a step 259, the record identifier is compared to the input search string of step 245, and if they are equal, an exact match is identified in a step 263. If there is no exact much, but the input search string equals the beginning of the record identifier (for example, an input search string "IIA" equals the beginning of the record identifier "IIAI"), then a partial match is identified in a step 271. If neither an exact much nor a partial match is identified, then no match is identified in a step 275. The process then loops from a step 279 to search for additional matches through the entire database.

According to related embodiments of the invention, an alternative, more efficient method for identifying exact and partial matches is based on dividing the method shown in FIG. 2C into a preparatory method and a matching method. The preparatory method is executed during the setup and maintenance of the database, where the database is extended to include a record identifier field for each record, by repeating steps 249-255 for all the records of the database and adding or associating the result of step 255 with the respective record. Then, whenever a search for matches is run, steps 249-255 of FIG. 2C are replaced by a single step of "retrieve record identifier from database record", with the rest of the process remaining the same as in steps 259-279.

It will be appreciated that the above methods are non-limiting embodiments of the present invention which further clarify the concepts of exact match, partial match and no match, and are not meant to represent efficient algorithms or restrict the matching method in any way. Further elaboration of the matching concept is demonstrated with reference to FIGS. 5A-5B below.

Results Display and Further Selection

Figures 3A, 3B:
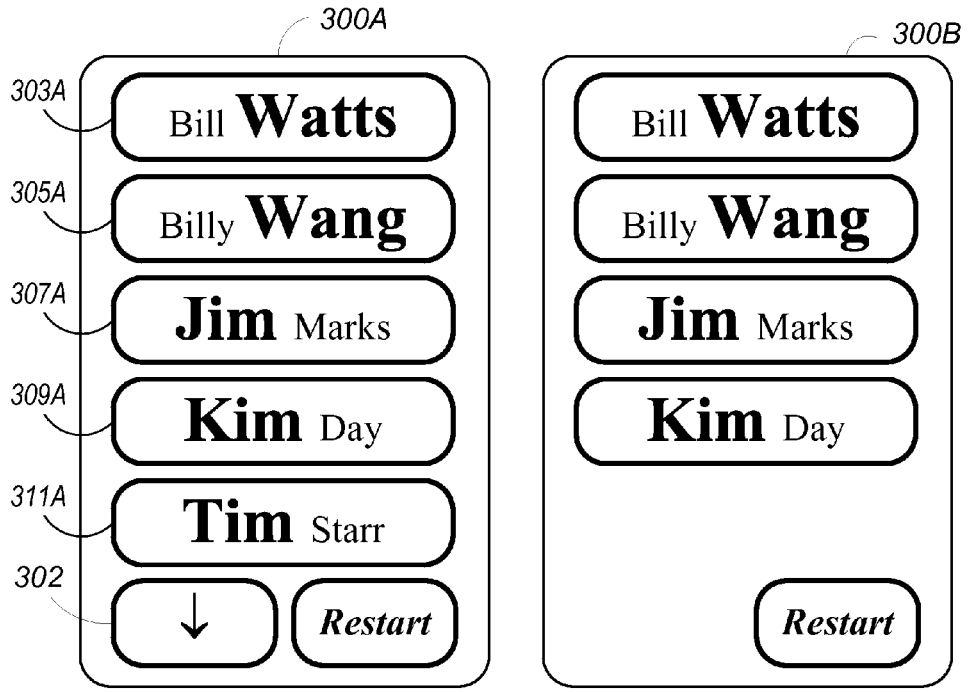
FIG. 3A and FIG. 3B illustrate selection screens according to certain embodiments of the present invention.

FIGS. 3A-3D conceptually illustrate exemplary displays that result from the method illustrated in FIG. 2A. A display 300A pertains to a case in which a user has entered the search string (of vowels) "IA", and where the results of step 215 or step 217 include more names than comfortably fit on a single screen shown in FIGS. 3A-3D (in this non-limiting example, five). In this case, the first five names (according to the ordering policy, see FIG. 4 below) are displayed as buttons 303A-311A, while a button 302 provides both an indication of having more names on the next page(s), as well as a means for moving to the next page. The user may press any of the name buttons for dialing to the respective person; press button 302 for moving to the next page; or press "Restart" to restart the method (FIG. 2A), in case of mistype or other input error that leads to incorrect results. In some implementations, the user may swipe the screen instead of pressing button 302 in order to scroll to the next page. FIG. 3A also demonstrates highlighting either the first or the last name to conveniently distinguish it from other names in the same list of search results (including names in the following screen(s)). Thus, since "Bill" and "Billy" are close, the last name is highlighted, while, for the other names shown in FIG. 3A, the first names are highlighted, as may be convenient for many users.

A display 300B as shown in FIG. 3B is applicable to the case where the search has yielded no more names than comfortably fit on a single screen, whereupon button 302 is not shown on display 300A.

Figures 3C, 3D:
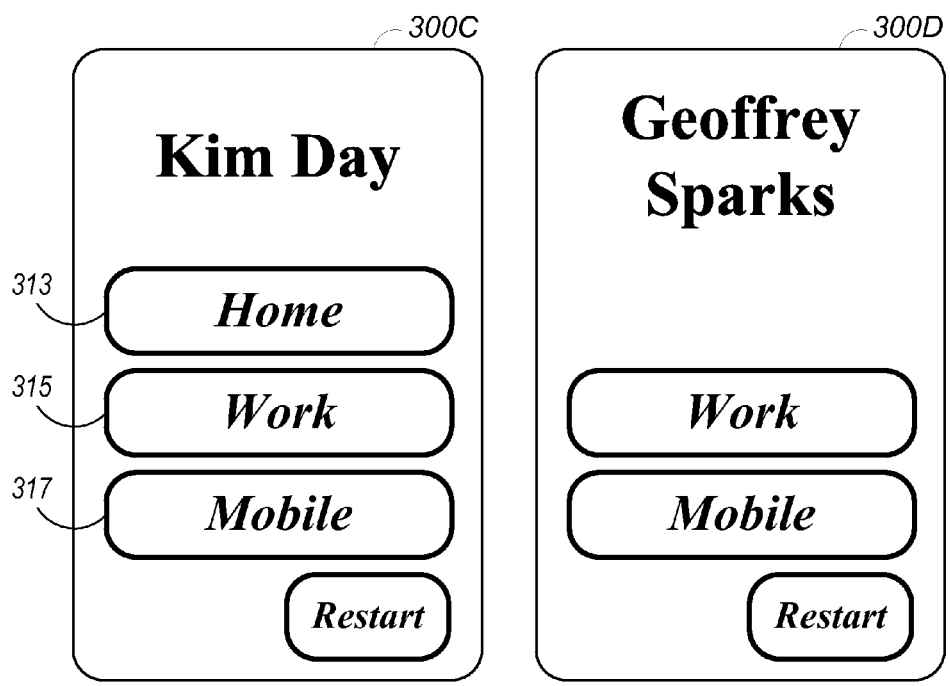
FIG. 3C and FIG. 3D illustrate dialing screens according to certain embodiments of the present invention.

A display 300C as shown in FIG. 3C pertains to the case where a contact person has more than one telephone number (such as for home, work, and mobile telephones). In this case, a user that has pressed, for example, the "Kim Day" button in either display 300A or display 300B will see display 300C for selecting among these options by pressing a "Home" button 313, a "Work" button 315, or a "Mobile" button 317.

A display 300D as shown in FIG. 3D pertains to the case where a search has yielded only a single name. If the respective person is associated with only a single phone number, then the person's name will appear or a single button in display 300B, for final user approval before placing a call. If, however, the retrieved contact ("Geoffrey Sparks" in this non-limiting example) has both work and mobile phone numbers, then display 300D allows the user to select the appropriate number to dial.

Setup and Maintenance of a Database

In certain embodiments of the invention, the database from which data is extracted (e.g., a contact database or a navigation database), is hosted in the memory of the mobile device. In other embodiments, the database is hosted in a remote server. According to various embodiments, additional preparatory steps are taken to ease the retrieval of data by excluding some records from the search procedure and/or prioritizing the order of presenting certain search results. Depending on the host location of the database, such steps are executed in the mobile device and/or the remote server.

Following the non-limiting example of a maximum of five matches to be displayed on the screen (see FIGS. 2A-2B and FIG. 3A), it is desirable to complete a search with not more than five matches. When this goal cannot be accomplished, the content of the first screen and the order of presenting results in the following screens, may negatively impact the convenience in finding a sought record. The embodiment described in the following description pertains to a contact database hosted in a mobile device, but is extendible to any database that can be hosted in a device or in a remote server. The following method may be conveniently carried out by using a personal computer, with the results copied into a mobile device.

Figure 4:
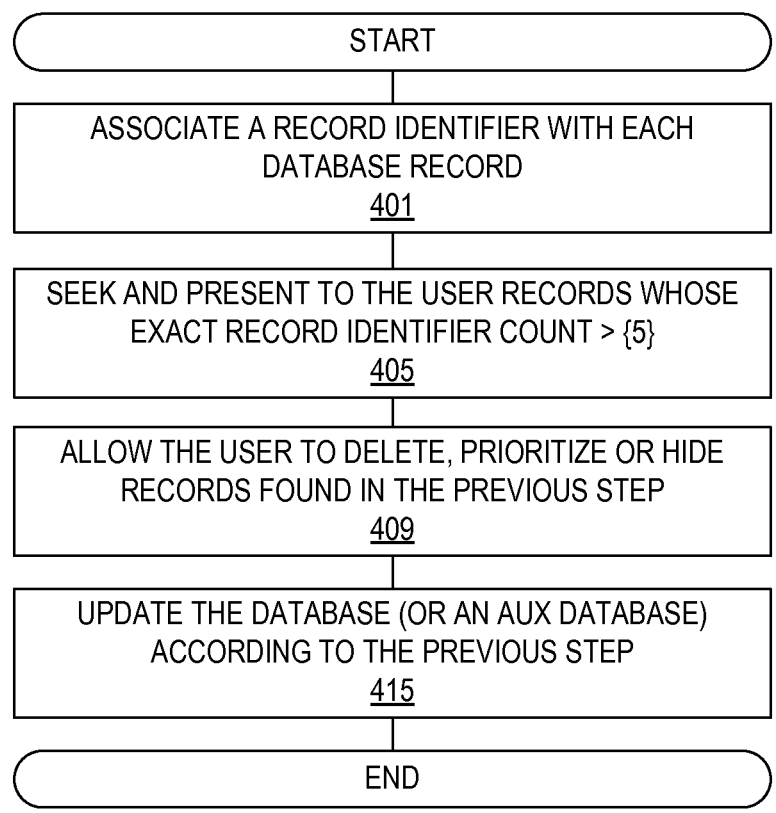
FIG. 4 illustrates a method according to yet another embodiment of the present invention.

Reference is now made to FIG. 4. In a step 401, all the records of a database (in a non-limiting example, a contact database hosted in a mobile device) are processed to extract a record identifier for each record. The record identifier is a string of all characters of the alphabet subset (for example, vowels), extracted from a predetermined function of search fields, in a non-limiting example the concatenation <first_name>+<last_name>. Non-limiting examples of record identifiers of several database records is shown in a table 500A of FIG. 5, with "AE" being the record identifier of Brad Hess and "AEAIO" being the record identifier of Gayle Faircloth. As is further demonstrated by table 500A, many record identifiers are similar for multiple names, the number determined by the size and specific content of the database. A step 405 seeks record identifiers associated with more than five records (in this non-limiting example), i.e. that require more than a single screen to display, and the respective names are then presented to the user. The user may then recognize that some of the records are obsolete, while some others, e.g. overseas contacts, are unlikely to be called by the user using the methods of the present disclosure. In a step 409 the user may delete obsolete records and tag some other records as hidden, i.e. excluded from the list of search results of the methods illustrated in FIGS. 2A-2B. If the remaining names for the record identifier under consideration are more than five, the user may select the five records to be included in the first screen, and prioritize the order of appearance of other names in the following screens. In a step 415 the user's selections for hiding and/or prioritizing the appearance order of selected names are recorded either in the contact database, or in an auxiliary database, and such selections are accessed in a step 221 (FIG. 2A or FIG. 2B) for exhibiting the search results to the user (see further discussion with reference to FIG. 6 below.)

Partial and Exact Matches

Table 500A of FIG. 5A illustrates a non-limiting arbitrary segment of a contact database, where the first column ("ID") shows the record identifier of each record, which is formed by extracting all alphabetic subset characters (vowels in the present example) from the predetermined function of search fields (<first_name>+<last_name> in this example). The record identifiers shown in the first column are exact, in the sense that they include all the vowels of the respective search screens. Thus, "AE" is the exact match of the first three records. It shall be notices also that all 16 names in table 500A following Alex Yang include the string "AE" as a partial match, because their first two vowels are "AE".

Step 213 (FIGS. 2A-2B) seeks matches that can be either exact or partial, and step 219 display matches (five or less, in this non-limiting example), even if they are partial matches. In the example of table 500A, entering "AE" or "AEA" will not lead to a display of the names (step 219) because the number of matches (both exact and partial) exceeds five, while "AEAE" will lead to a display of three names—two exact matches and one partial match.

A table 500B in FIG. 5B demonstrates the notion of database exhaustion (step 217 of FIGS. 2A-2B). Entering the string "AAA" yields eight names, which are too many for a single-screen display. On the other hand, in the present example there are no entries in the database that are or start with "AAAA", "AAAE", "AAAI", "AAAO" or "AAAU". Accordingly, step 217 leads directly to an immediate two-screen display of the eight names without waiting for another keystroke, because no additional vowel entries can narrow the search in the database of FIG. 5B.

Ordering Records on Multiple Screens

When the number of search results to be displayed on the screen exceeds the predetermined capacity of a single screen (five names in the non-limiting examples illustrated in FIGS. 2A-2B), a multi-page display of names is required. The order of the displayed names, and particularly the names selected for the first screen, further contribute to the convenience afforded by embodiments of the present invention.

FIG. 6 illustrates a method according to various embodiments of the invention for determining the display order of names matching the search string of alphabet subset characters entered by the user (vowels in the present non-limiting example). A step 601 identifies exact matches for the search string, for assigning higher priority than partial matches. Assigning a higher priority for exact matches is especially meaningful upon reaching step 215 (FIGS. 2A-2B), where no additional keystrokes are expected. Under such circumstances, as with the example illustrated by table 500A of FIG. 5A, a user entering the keystrokes "AE" followed by "Search" into keypad 100A will see on the first screen the three exact matches for "AE" (FIG. 5A) even if they are not the first in the list of alphabetically-sorted names. It may happen that a large number of names have partial matches for certain search strings (in this example, all the names in table 500A are a partial match for "AE"). The rationale behind assigning a higher priority for exact matches is that the user could enter additional characters to narrow the search, but decided not to use this option.

A step 605 identifies matched names that also appear in the phone's call log (which is customary in cellular phones) as the most recent incoming/outgoing calls, while a step 609 identifies in the call log numbers that have called or have been called most frequently within the most recent month, for example. A step 613 retrieves user preferences regarding name display priorities, such as those entered in step 409 (FIG. 4). In a step 617 the results of steps 601, 605, 609 and 613 are taken into account, according to a policy determined by the application programmer or by user preferences, to determine which names are displayed on the first page, and how names are ordered on all pages. Such policies may be, for example, last calling/called numbers are of the highest priority, or exact matches will always be first to display. In a step 621, the matches, as sorted by step 617, are displayed in a multiple-screen arrangement (for example, first page as shown by display 300A of FIG. 3A, with button 302 included for selectably moving to the next pages).

Using Hard Keys

All the previously-disclosed embodiments and examples use a touchscreen as both an input and output device. However, other embodiments of the invention may use hard keys in cooperation with a touchscreen or a screen that is not touch sensitive. For example, a small hard keypad may be embedded in the hub of a vehicle steering wheel, with a multimedia screen in the dashboard for displaying search results and multimedia data included in database records.

FIG. 7 illustrates an embodiment of the invention featuring a navigation arrangement for a motor vehicle, wherein a keypad 700K is embedded in the hub of the steering wheel, and a screen 700D is the vehicle's multimedia screen. Keypad 700K includes five vowel keys and a "Search" key. In a non-limiting example utilizing this embodiment, the user has pressed the string of vowels "AIEOU", and the vehicle's navigation system accesses a street name database that may be hosted locally (i.e. embedded in the vehicle) or in a remote navigation server, and retrieves the four matches displayed on screen 700D. The user then presses the same hard keys, which also serve for inputting the numerals 1-5, to make a selection, or touches the desired street name on screen 700D, when screen 700D is a touchscreen.

FIG. 7A illustrates is a remote control unit 710 according to another embodiment of the invention, where keys 712 provide touch input for search strings, a button 714 functions as a "Search" button, and a button 712 functions as a "Next" button. A microphone 722 receives voice input when the user employs voice mode (described below). Remote control unit 710 may form part of a Bluetooth earpiece, or be mounted in the vehicle steering wheel.

Voice Commands

As noted in the Background section above, certain embodiments of the present invention teach an alternative to voice commands. In other embodiments of the invention, however, voice commands replace part or all of the screen and keypad functionalities previously described.

Some users who find that conventional voice commands do not work for them, for example, because of their accent, find it practical and desirable to train their portable device to accurately recognize a limited vocabulary using their own accent, or even using a foreign language. Using training methods and technologies known in the art, users may find it convenient to train their mobile device to recognize seven voice commands that are equivalent to pressing the seven soft keys of FIG. 1A. According to an embodiment of the present invention, a screen similar to display 700D (FIG. 7) is displayed in response to such voice commands, and the system accepts further selection by the user via simple voice commands (e.g., numerals 1-5 and "next") which the mobile device is trained to recognize, even when spoken with an accent or in a foreign language.

In related embodiments of the invention, synthesized speech is used to supplement or replace screen display. Thus, in a non-limiting example, 1-5 search results may be read through a loudspeaker, from which the user may select by repeating one of the read results, or by saying a numeral that identifies a result by its position in the read sequence of results.

Hardware

FIG. 8 is a hardware block diagram according to an embodiment of the present invention, for implementing the data retrieval methods described above in a mobile telephone.

A cellular handset 800 includes a processor 818 that executes the steps of the methods illustrated in FIGS. 2A, 2B, 4, and 6, and controls the I/O (input/output) operations via an input device 814 and an output device 822. In a related embodiment, input device 814 and output device 822 include a touchscreen such as illustrated in FIGS. 1A-1D and 3A-3D. Further related embodiments, also include a speaker, hard keys, a pointing device, a vibration generator, and other I/O devices known in the art. A memory 830 is a nonvolatile memory device (random-access memory is typically included in processor 818 and is not shown separately herein). Memory (e.g., a storage device) 830 stores software 834 that is executed by processor 818 and includes an operating system 838 and applications 842. At least one of applications 842 includes code for executing the methods described in FIGS. 2A, 2B, 4, and/or 6. In certain embodiments, applications 842 include a dialer application 845 and/or a navigator application 847. Memory 830 also stores documents 850 and databases 854 that include, for example, a contact database and/or a navigation database from which data is retrieved according to the disclosed embodiments. In additional embodiments, functional hardware 870 includes, but is not limited to, components such as a GPS chip, a camera, accelerometers, etc., which may participate in previously-disclosed methods. For example, the GPS chip may participate in a navigation session to a destination retrieved from a database according to embodiments of the invention. Communication module(s) 866 include chips and transducers for communication functionalities such as cellular, Wi-Fi, Bluetooth, infrared and NFC communication. A battery 858 energizes all the units of cellular handset 800, and an enclosure 862 physically holds and protects all hardware units as a portable appliance.

In some embodiments, servers connected via a cellular or Wi-Fi network maintain a database and take part in the execution of methods described above. As a non-limiting example, a navigation server 874 includes a processor 882 that is programmed to manage an online navigation session of a user of cellular handset 800. In specific embodiments, processor 882 is programmed to execute the method shown in FIG. 2B, according to a vowel search string entered by the user into input device 814 for retrieving data from navigation database 886. In a related embodiment, processor 882 is programmed to participate with cellular handset 800 during the execution of the method of FIG. 4, and then store the user preferences in the user's records within user database 878.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A method for retrieving data from a database, the database including a plurality of database records, each database record having one or more text fields containing ordered characters from an alphabet, the method comprising:
    providing a keypad comprising a plurality of keys, each key of the plurality of keys having exactly one character of a subset of the alphabet displayed thereon, and wherein each key of the plurality of keys is exclusively operable for inputting the character displayed thereon, wherein the keypad does not include any key operable for inputting any character of the alphabet that does not belong to the subset;
    wherein the subset of the alphabet comprises a plurality of different characters of the alphabet and consists of no more than the smaller of half of the alphabet or sixteen characters of the alphabet;
    receiving, from the keypad, a search string that includes an ordered sequence of a plurality of characters of the subset and no characters of the alphabet that do not belong to the subset;
    responsive to receiving the search string, selectively retrieving, by a processor, a non-negative integer number of database records, wherein each retrieved database record includes the characters of the search string interspersed within a predefined function of at least one text field of the database record, such that the subset characters interspersed within the predefined function appear in the same order as the characters of the search string; and
    if the non-negative integer number is at least one, presenting the retrieved database records.

2. The method of claim 1, wherein the database is a contact database and the predefined function concatenates name fields of the database record.

3. The method of claim 1, wherein said providing comprises displaying said keypad on a touch screen.

4. The method of claim 1, wherein said providing comprises providing a hard keypad.

5. The method of claim 1, further comprising:
    if the integer number is at least two, receiving a user selection of a retrieved database record.

6. The method of claim 1, wherein the alphabet is the Roman alphabet.

7. The method of claim 6, wherein the subset comprises the characters 'a', 'e', 'i', 'o', and 'u'.

8. The method of claim 7, wherein the subset further comprises at least one character selected from the group consisting of 'h', 'y', and 'w'.

9. The method of claim 3, wherein providing the keypad comprises providing a keypad comprising at least one control key.

10. The method of claim 4, wherein providing the keypad comprises providing a keypad comprising at least one control key.

11. The method of claim 1, wherein at least one record of the database further comprises multimedia data.

12. The method of claim 1, wherein the alphabet is other than the Roman alphabet and the subset includes the vowels of the alphabet.

13. The method of claim 2, further comprising:
receiving a user input that selects a selected database record from the retrieved database records;
extracting an address from the selected database record; and
initiating a communication session according to the address.

14. The method of claim 13, wherein initiating the communication session comprises initiating at least one selected from the group consisting of a telephone call, a short text message, an email, an instant messaging session, a social network message, and a multimedia message.

15. A method for initiating a communication session from a mobile device, the mobile device including a storage device that stores a contact database, the database including a plurality of database records, each database record including a contact identifier in the form of an ordered set of characters from an alphabet, and address data effective for initiating a communication session, the method comprising:
displaying, on a touchscreen of the mobile device, a keypad comprising a plurality of keys, each key of the plurality of keys having exactly one character of a subset of the alphabet displayed thereon, and wherein each key of the plurality of keys is exclusively operable for inputting the character displayed thereon, wherein the keypad does not include any key operable for inputting any character of the alphabet that does not belong to the subset;
wherein the subset of the alphabet comprises a plurality of different characters of the alphabet and consists of no more than the smaller of half of the alphabet or sixteen characters of the alphabet;
receiving, via the keypad, a search string that includes an ordered sequence of a plurality of characters of the subset and no characters of the alphabet that do not belong to the subset;
responsive to receiving the search string, selectively retrieving, by a processor, a non-negative integer number of database records, wherein each retrieved database record includes the characters of the search string interspersed within a predefined function of at least one text field of the database record, such that the subset characters interspersed within the predefined function appear in the same order as the characters of the search string; and
if the non-negative integer number is at least one:
presenting the retrieved database records,
receiving a selection of a retrieved database record, and
initiating a communication session according to address data included in the selected record.

16. The method of claim 15, wherein initiating the communication session comprises initiating at least one selected from the group consisting of a telephone call, a short text message, an email, an instant messaging session, a social network message, and a multimedia message.

17. A mobile communication device comprising:
a communication module;
a storage device storing a contact database, the database including a plurality of database records, each database record including a contact identifier in the form of an ordered set of characters from an alphabet, and address data;
a keypad comprising a plurality of keys, each key of the plurality of keys having exactly one character of a subset of the alphabet displayed thereon, wherein each key of the plurality of keys is exclusively operable for inputting the character displayed thereon, and wherein the keypad does not include any key operable for inputting any character of the alphabet that does not belong to the subset;
wherein the subset of the alphabet comprises a plurality of different characters of the alphabet and consists of no more than the smaller of half of the alphabet or sixteen characters of the alphabet; and
a processor configured to:
receive, from the keypad, a search string comprising an ordered sequence of a plurality of characters of the subset and no characters of the alphabet that do not belong to the subset;
responsive to receiving the search string, selectively retrieve a non-negative integer number of database records, wherein each retrieved database record includes the characters of the search string interspersed within a predefined function of at least one text field of the database record, such that the subset characters interspersed within the predefined function appear in the same order as the characters of the search string; and
if the non-negative integer number is at least one:
present the retrieved database records,
receive a selection of a retrieved database record, and
initiate a communication session according to address data included in the selected record.

18. The mobile communication device of claim 17, wherein the communication session comprises at least one selected from the group consisting of a telephone call, a short text message, an email, an instant messaging session, a social network message, and a multimedia message.

19. The mobile communication device of claim 17, wherein the keypad is a soft keypad that includes the subset characters displayed on a touchscreen.

20. The mobile communication device of claim 17, wherein the keypad is a hard keypad including physical keys.

* * * * *